Feb. 23, 1926.
P. MUELLER
1,574,052
SLIP JOINT COUPLING
Filed Nov. 12, 1919
2 Sheets-Sheet 1
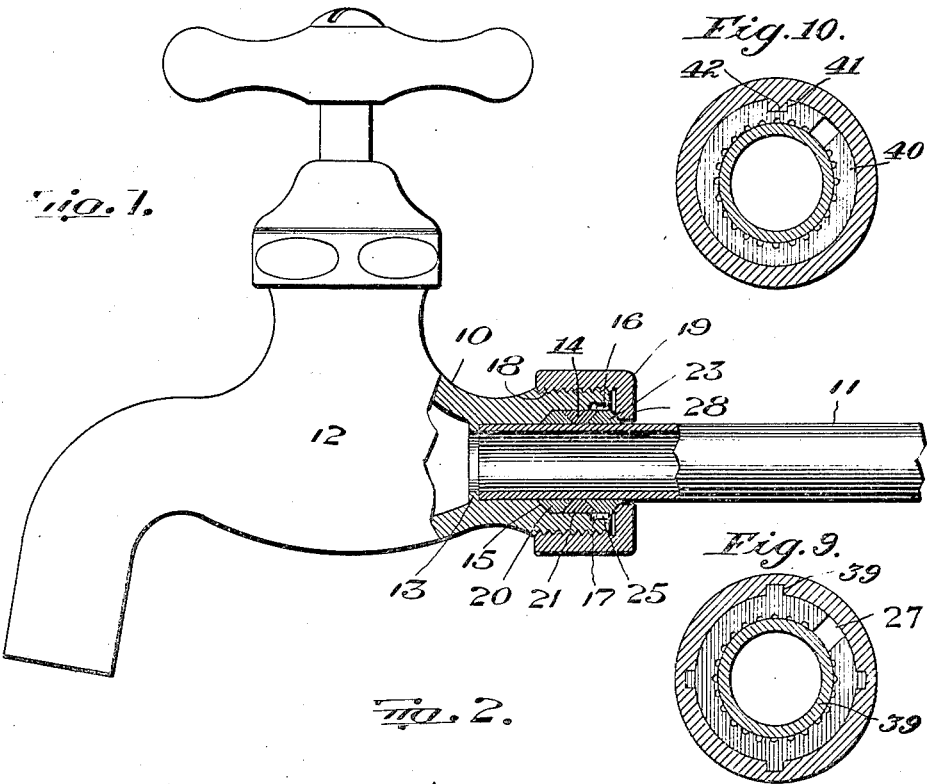
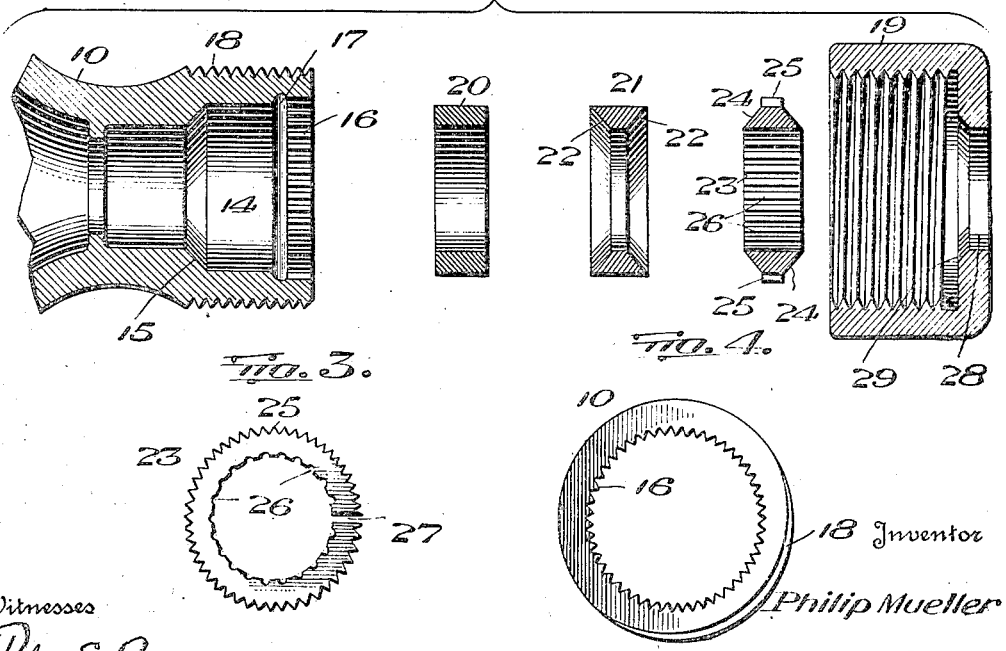

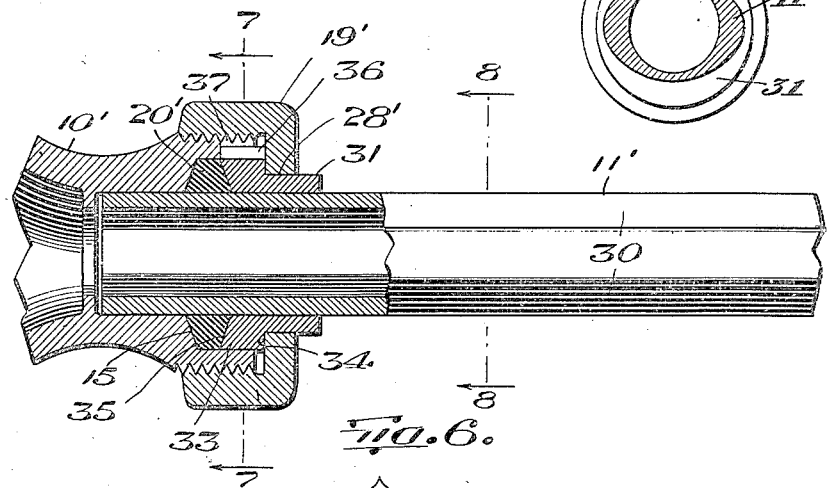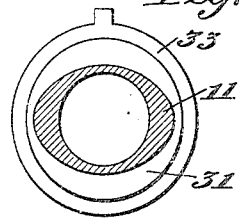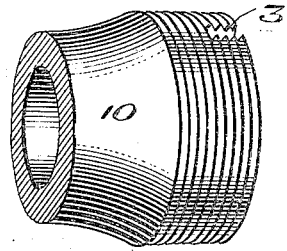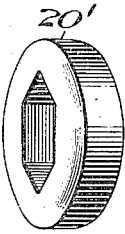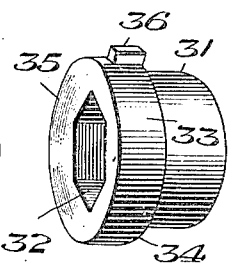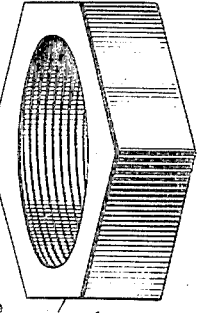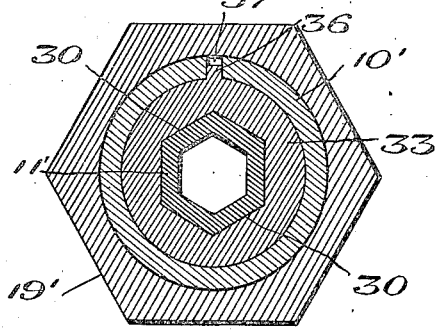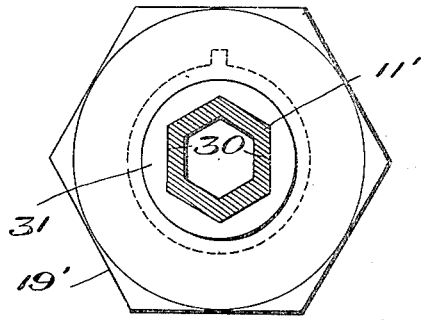

Patented Feb. 23, 1926.

1,574,052

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

SLIP-JOINT COUPLING.

Application filed November 12, 1919. Serial No. 337,486.

*To all whom it may concern:*

Be it known that I, PHILIP MUELLER, a citizen of the United States, residing at Decatur, in the county of Macon and State of Illinois, have invented new and useful Improvements in Slip-Joint Couplings, of which the following is a specification.

This invention relates to pipe couplings of the slip joint type wherein two telescopic members may be detachably secured together in desired adjusted positions.

In the art of water distribution, slip joint couplings are frequently employed to permit relative longitudinal adjustment of two members such as water pipes, so as to allow for ready installation of the parts without requiring that the members be of the exact length or threaded to make the necessary connections.

The present invention has as its purpose to provide a slip joint coupling which will permit of any desired longitudinal and angular adjustment between two telescopic members and which will maintain the members in their adjusted positions against relative angular movement. Slip joint couplings constructed in accordance with the present invention will permit of ready assembly and adjustment of the pipe members, and provide a fluid tight joint which will effectively prevent leakage of the fluid conveyed by the members.

In the present disclosure, I have illustrated two embodiments of my improved coupling and in each embodiment the coupling is shown as employed for securing a cock or faucet in adjusted telescopic position upon a supply pipe, but it is to be understood that the present disclosures are merely illustrative and not restrictive of my invention and my invention is adaptable to other uses than that shown.

In the drawings herewith:—

Figure 1 is a sectional view of one embodiment of my invention, the same being shown as applied for securing a faucet to a supply pipe, the body portion of the faucet being in elevation.

Fig. 2 is a sectional view of the parts of the coupling shown in Fig. 1, the parts being illustrated in disassembled position.

Fig. 3 is an elevational view of a clamping ring of the coupling.

Fig. 4 is an end view of the outer pipelike member, in the present instance the same being the shank of a faucet.

Fig. 5 is a view similar to Fig. 1 and shows another embodiment of my invention.

Fig. 6 is a perspective view of the parts of the coupling shown in Fig. 5, the parts being illustrated in disassembled position.

Fig. 7 is a sectional view taken on line 7—7 of Fig. 5.

Fig. 8 is a sectional view taken on line 8—8 of Fig. 5.

Fig. 9 is a cross-sectional view to illustrate a slightly different form of clamping ring.

Fig. 10 is a similar view illustrating still another form of clamping ring.

Fig. 11 is a view similar to Figure 8 illustrating a coupling in which the pipe is oval in cross-section.

Referring to the drawings wherein like numerals represent like parts in the several views, 10 designates the outer pipe member into which the inner pipe member 11 of smaller diameter telescopes.

In the present illustrative disclosure of my invention, the outer member 10 is disclosed as being the shank of a faucet 12, but it is to be understood that my invention may be employed for securing a supply pipe to a service pipe or tail piece, or in fact in any case where two telescopic pipe members are to be secured in adjusted position. The passage in the faucet shank 10 may have a shoulder 13 against which the inner end of the smaller pipe 11 may abut to limit the inward movement of the pipe 11, but this shoulder may be eliminated if desired. The passage through the shank is of increased diameter at its outer end so as to provide an annular recess or chamber 14 about the inner pipe 11 and which recess receives the rings of the coupling hereinafter described in detail.

The recess 14, at its inner end, teminates in a shoulder 15 which is inclined inwardly towards the body portion of the cock. Adjacent the outer edge of the recess are a plurality of internal longitudinally extending ribs 16 which form a band of serrations. Those serrations terminate at their inner ends in an internal circumferential groove 17, this groove being provided to facilitate the operation of forming the ribs 16 and also to provide sufficient clearance to allow for the necessary adjustment or movement of the hereinafter described clamping ring. The shank, as is usual, is externally threaded as at 18 so as to receive the internal threads of a coupling nut 19.

The numeral 20 designates a packing of any suitable compressible material and the wall of this packing as most clearly shown in Fig. 2 is normally rectangular in cross section.

The numeral 21 designates a metallic wedging ring, the opposite internal edges of which are beveled as at 22 so that the wall of the ring is substantially wedge shape in cross section.

The numeral 23 designates a clamping ring formed of any suitable metallic material and split, as at 27, to permit the same to be contracted. The opposite external edges or corners of this ring are beveled as at 24 and between the tapering or beveled surfaces 24 is a cylindrical serrated surface 25. The serrations or ribs on this surface 25 are similar to and of equal number with the ribs or serrations 16 of the shank 10 with which they engage or interlock. The ring 23 is provided on its inner circumference with longitudinally extending serrations 26 which are provided to cause the clamping ring, when contracted, to securely grip the inner pipe member 11 and, if desired, the serrations 26 may be fewer in number and less pronounced than the serrations 25.

The coupling nut 19 has an opening 28 which closely receives the inner pipe member 11 and the inner edge of the opening is beveled so as to provide an inclined shoulder 29 which is adapted to engage against the outer beveled surface 24 of the clamping ring 23 to contract the latter when the nut is screwed into place upon the threaded portion 18 of the shank 10.

In assembling the parts of the coupling just described, the packing ring 20 is first inserted into the recess 14 of the shank 10, then the wedging ring 21 is inserted, and this is followed by the clamping ring 23 with the external serration 25 of the clamping ring interlocking with the serrations or ribs 16 of the shank. After the shank 10 is properly adjusted both longitudinally and angularly upon the pipe 11, the nut 19 is screwed into place upon the threaded portion 18 of the shank 10. It is, of course, obvious, that if desired, the nut 19, the clamping ring 23, wedging ring 21 and the washer 20 may be slipped onto the pipe 11 before the pipe 11 is inserted into the bore of the shank 10, and after the faucet is mounted on the pipe 11 the nut may be moved forwardly to force the rings into the recess 14 of the shank and the nut may then be screwed into place.

When the nut 19 is screwed forwardly on the threaded portion of the shank, the wedging ring 21 is forced against the washer 20 and due to the oppositely inclined shoulder 15 and beveled surface 22, the washer is caused to be packed tightly about the inner pipe 11 so as to prevent leakage of water through the coupling. The outer inclined surface 22 of the wedging ring 21 and the beveled shoulder 29 of the nut 19 cause the clamping ring 23 to contract and tightly grip about the supply pipe 11. The serrations 26 bite into or grip the outer surface of the inner pipe 11 and prevent relative rotation between the supply pipe and the wedging ring 23. Due to the engagement between the external serrations 25 of the clamping ring 23 and internal serrations 16 of the shank 10 relative rotary movement between the shank and clamping ring is prevented. It will, therefore, be noted that due to the clamping ring 23 relative angular and longitudinal movements of the supply pipe 11 and the faucet cannot take place. It will be seen that the circumferential groove 17 will permit sufficient clearance for the inward movement of the clamping ring 23 to allow for the compression of the washer 20.

Referring now to the embodiment of my invention illustrated in Figs. 5 to 8, inclusive, the shank 10' of the faucet is very similar in construction to the shank 10 hereinbefore described except that the internal serrations 16 and the groove 17 are omitted. That portion of the inner pipe 11' which telescopes into the bore of the shank 10' is provided with a plurality of plane faces 30, in the present instance, the perimeter of this portion being hexagonal in cross-section. It is evident that the outer perimeter of the inner pipe may be polygonal or oval in cross-section throughout its length.

A clamping ring is adapted to be slipped upon a non-circular portion of the pipe 11' and in the present case, this clamping ring comprises a sleeve 31 having an opening 32 of the same configuration in cross-section as the portion 30 of the supply pipe 11', that is, in the present instance, the opening 32 is hexagonal in cross-section. The outer perimeter of the sleeve 31 is cylindrical in shape and adjacent one end thereof is provided a circumferential rib 33 which forms a shoulder 34. The outer end of the sleeve 31 is beveled to provide an inclined surface 35, the surface 35 and the shoulder 15 of the shank 10' being inclined in opposite directions so as to force the packing ring or washer 20' about the pipe 11'.

The coupling nut 19' has an opening 28' which is substantially of the same diameter as the cylindrical portion of the sleeve 31 so that when the nut 19' is screwed onto the threaded portion of the shank 10', the edge about the opening 28' will engage against the shoulder 34 of the sleeve 31 to force the sleeve into the counter bored or recessed end of the shank 10' and cause the packing ring 20' to be wedged tightly against the inner pipe 11'. Due to frictional engagement between the shoulder 34 of the sleeve 31 and the nut 19', relative movement between the sleeve and shank 10' is prevented and the supply pipe 11' cannot rotate within the sleeve 31, owing to the polygonal formation of the supply pipe.

To further insure against relative angular movement between the shank 10' and the sleeve 31, the latter may be provided with a key or lug 36 extending radially from the rib 33, and the outer end of the shank may have a notch 37 adapted to receive the lug 36. It is obvious that when the lug 36 is engaged within the notch rotary movement between the shank and the sleeve 31 is positively prevented.

In Figure 9, I have illustrated a slightly different form of clamping ring in which a split ring 38 having internal gripping corrugations is provided but said ring, instead of having external corrugations, as shown in Figure 3, may be provided with lugs 39 which will engage suitable notches formed in the shank of the faucet 12 or the internal bore of the pipe with which the coupling is made.

In Figure 10 is illustrated a construction in which the clamping ring 40 is serrated on its inner surface and provided with one or more notches 41 in its outer periphery which notches are engaged by upwardly projecting lugs 42 formed in the inner bore of the shank of the faucet 12 or the pipe with which the coupling is made.

In Figure 11, I have illustrated a further adaptation of my device showing the pipe 43 of oval conformation in cross-section so as to positively lock the pipe against turning within the coupling.

With the use of the serrated clamping ring hereinbefore described, it has been found that when such ring is compressed by the coupling nut 19 that the serrations on the inner periphery of the ring indent and bite into the surface of the pipe so that not only is the pipe securely held against rotary movement but that longitudinal movement of the pipe is prevented by reason of the fact that the serrations, biting into the surface, would necessitate a grooving out of the metal of the pipe longitudinally before any relative longitudinal displacement of the parts could take place.

It is, of course, obvious that my invention is susceptible of various modifications and changes which could be within the spirit of the invention without departing from the scope of the following claims.

I claim:

1. In a slip joint coupling, an outer pipe member, an inner pipe member, and a ring between said pipe members having means on its inner and outer peripheries for positively engaging the opposed walls of the pipe members so as to prevent relative rotary movement between said pipe members.

2. In a slip joint coupling, an outer pipe member, an inner pipe member, and a split ring between said pipe members locked to each of the same for preventing relative rotary movement between said pipe members.

3. In a slip joint coupling, an outer pipe, an inner pipe, a recess between said pipes, a split ring in said recess having means for positively locking the same against relative rotation to one of said pipes, and means engaging said ring so as to radially spring the same and thus have one perimeter thereof forced against the opposed perimeter of the other pipe.

4. In a slip joint coupling, an outer pipe, an inner pipe, a recess between said pipes, a split clamping ring in said recess, means for locking the ring against rotation relative to the outer pipe, and means for contracting the ring so as to cause the inner periphery of the same to engage or grip the inner pipe.

5. In a slip joint coupling, an outer pipe, an inner pipe, a recess between said pipes, a split ring in said recess, serrations on one of the perimeters of said split ring, serrations on the opposed perimeter of one of the pipe members adapted to interlock with the said first serrations, and means for springing the split ring radially to force the other perimeter thereof against the pipe not provided with such serrations.

6. In a slip joint coupling, an outer pipe having an enlarged bore at one end, an inner pipe, a clamping ring within said counter-bore, inter-engaging serrations on the external perimeter of the clamping ring and the opposed surface of said recess, said clamping ring having its opposite external edges beveled, a shoulder within the recess, a coupling nut having a beveled edge inclined oppositely to said shoulder, said shoulder and beveled edge being adapted to engage the bevel surfaces of said clamping ring so as to cause the same to contract and tightly grip the inner pipe.

In testimony whereof I have hereunto set my hand.

PHILIP MUELLER.